(12) United States Patent
Sagong et al.

(10) Patent No.: US 9,374,155 B2
(45) Date of Patent: Jun. 21, 2016

(54) APPARATUS AND METHOD FOR REDUCING TDMA NOISE IN TERMINAL (71) Applicant: Samsung Electronics Co., Ltd, Gyeonggi-do (KR)

(72) Inventors: Jin Sagong, Gyeonggi-do (KR); Jisang Kim, Gyeonggi-do (KR); Sangeun Kim, Seoul (KR); Taegyun Kim, Gyeonggi-do (KR); Jaeyong Sim, Gyeonggi-do (KR); Byeongdo Ahn, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 13/744,175

(22) Filed: Jan. 17, 2013

(65) Prior Publication Data

US 2013/0223430 A1    Aug. 29, 2013

(30) Foreign Application Priority Data

Feb. 24, 2012    (KR) .................. 10-2012-0019045

(51) Int. Cl.
*H04W 88/08* (2009.01)
*H04B 7/26* (2006.01)
*H04B 15/04* (2006.01)

(52) U.S. Cl.
CPC .............. *H04B 7/2643* (2013.01); *H04B 15/04* (2013.01)

(58) Field of Classification Search
CPC .... H04B 15/02; H04B 7/2643; H04B 7/2656; H04W 88/08
USPC ........................................................ 370/347
See application file for complete search history.

(56) References Cited

U.S. PATENT DOCUMENTS

| | | | |
|---|---|---|---|
| 6,694,034 B2* | 2/2004 | Julstrom et al. | 381/315 |
| 6,980,511 B1* | 12/2005 | Li | H04L 12/5693 370/230 |
| 7,190,187 B2* | 3/2007 | Hua et al. | 326/27 |
| 7,206,426 B1* | 4/2007 | Julstrom | H04R 25/558 381/315 |
| 2004/0150570 A1* | 8/2004 | Yuasa | H01Q 1/273 343/702 |
| 2011/0170703 A1* | 7/2011 | Palma | H04R 1/1041 381/74 |
| 2012/0063445 A1* | 3/2012 | Sim | 370/347 |
| 2012/0196566 A1* | 8/2012 | Lee | H04M 15/80 455/408 |

OTHER PUBLICATIONS

WO 03084152 A1.*

* cited by examiner

*Primary Examiner* — Andrew Chriss
*Assistant Examiner* — Voster Preval (57) ABSTRACT

An apparatus for reducing TDMA noise in a terminal transceiving a wireless signal in a TDMA scheme, includes an interface unit in which an output accessory is mounted, an audio processor including a virtual ground and transceiving an audio signal to and from an output accessory through the interface unit, a switch unit provided between the interface unit and the audio processor and switching such that a ground terminal of the interface unit is connected to one of a real ground or a virtual ground of the audio processor, and a controller controlling the switch unit to connect the ground terminal of the interface unit to the virtual ground when a call function using the output accessory is activated, in which the switch unit is configured by two or more switches which are connected to each other in a parallel connection.

14 Claims, 5 Drawing Sheets

APPARATUS AND METHOD FOR REDUCING TDMA NOISE IN TERMINAL

CROSS-REFERENCE TO RELATED APPLICATION(S) AND CLAIM OF PRIORITY

The present application is related to and claims the benefit under 35 U.S.C. §119(a) to a Korean patent application No. 10-2012-0019045 filed on Feb. 24, 2012 in the Korean Intellectual Property Office, the entire disclosure of which is hereby incorporated by reference.

TECHNICAL FIELD OF THE INVENTION

The present disclosure relates to an apparatus and a method for reducing Time Division Multiple Access (hereinafter referred to as 'TDMA') noise in a terminal, and more particularly, to an apparatus for reducing TDMA noise in a terminal capable of reducing TDMA noise induced in an earphone during calling using an output accessory such as an earphone, and a method thereof.

BACKGROUND OF THE INVENTION

In recent years, with the significant development of information and communication technology and a semiconductor technology, supply and use of all types of portable terminals have rapidly increased. In particular, recent portable terminals have developed to a mobile convergence stage including traditional unique field and other terminal fields. As a representative example of the portable terminals, a mobile communication terminal provides various functions such as a TV watching function (e.g., mobile broadcasting such as Digital Multimedia Broadcasting (DMB) or Digital Video Broadcasting (DVB)), a music playing function (e.g., MPEG Audio Layer-3 (MP3)), a photographing function, and an Internet access function as well as a general communication function such as speech call or message transmission/reception.

Meanwhile, when an earphone is mounted in the portable terminal, a ground terminal of the earphone is connected to a real ground of the portable terminal. As described above, if the ground of the earphone is connected to a real ground of the portable terminal, TDMA noise may be induced in the earphone through the real ground. That is, a portable terminal according to the related art has a problem in that TDMA noise occurs during an earphone call to deteriorate calling quality.

The TDMA noise is simply described. A portable transceiving a wireless in a TDMA scheme transmits the wireless signal for predetermined period. That is, the portable terminal activates a power amplifier for each transmission period to transmit the wireless signal. The power amplifier consumes great power. Due to this, voltage drop of a battery occurs for each transmission period in the portable terminal. As described above, noise generated in an audio output terminal due to voltage drop occurring for each transmission period is generally called TDMA noise.

When the portable terminal provides a radio receiving function, a portable terminal using an earphone as an antenna having no separate antenna for radio reception has been increased. As described, in a case of a portable terminal using an earphone as an antenna for receiving a radio signal, TDMA noise and a radio receiving function must be simultaneously considered. Accordingly, the portable terminal according to the related art has a difficulty in designing a circuit for reducing TDMA noise induced in an earphone.

SUMMARY OF THE INVENTION

To address the above-discussed deficiencies of the prior art, it is a primary object to provide an apparatus for reducing TDMA noise in a portable terminal capable of efficiently reducing TDMA noise generated during an earphone call, and a method thereof.

The present disclosure further provides an apparatus for efficiently reducing TDMA noise generated during an earphone call in a portable terminal using an earphone as an antenna for radio reception, and preventing deterioration of a radio receiving performance, and a method thereof.

In accordance with an aspect of the present disclosure, an apparatus for reducing TDMA noise in a terminal transceiving a wireless signal in a TDMA scheme, includes an interface unit in which an output accessory is mounted, an audio processor including a virtual ground and transceiving an audio signal to and from an output accessory through the interface unit, a switch unit provided between the interface unit and the audio processor and switching such that a ground terminal of the interface unit is connected to one of a real ground or a virtual ground of the audio processor, and a controller controlling the switch unit to connect the ground terminal of the interface unit to the virtual ground when a call function using the output accessory is activated, and wherein the switch unit is configured by two or more switches which are connected to each other in a parallel connection.

In accordance with another aspect of the present disclosure, a method of reducing TDMA noise in a terminal includes a radio frequency communication unit transceiving a wireless signal in a TDMA scheme, an interface unit in which an output accessory is mounted, an audio processor including a virtual ground and transceiving an audio signal to and from an output accessory through the interface unit, and a switch unit provided between the interface unit and the audio processor and switching such that a ground terminal of the interface unit is connected to one of a real ground or a virtual ground of the audio processor, the method includes controlling the switch unit to connect the ground terminal of the interface unit to the virtual ground of the audio processor when a call function using the output accessory is activated, wherein the switch unit is configured by at least two switches which are connected to each other in parallel.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4b, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device.

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Before a detailed description, a terminal according to an embodiment of the present disclosure provides an earphone call function. The terminal according to an embodiment of the present disclosure is a terminal transceiving a wireless signal in a TDMA scheme, and can include a mobile communication terminal, a smart phone, a Tablet Personal Computer (PC), and a personal digital assistant (PDA). Hereinafter, a mobile communication terminal is described by way of example.

Figure 1:
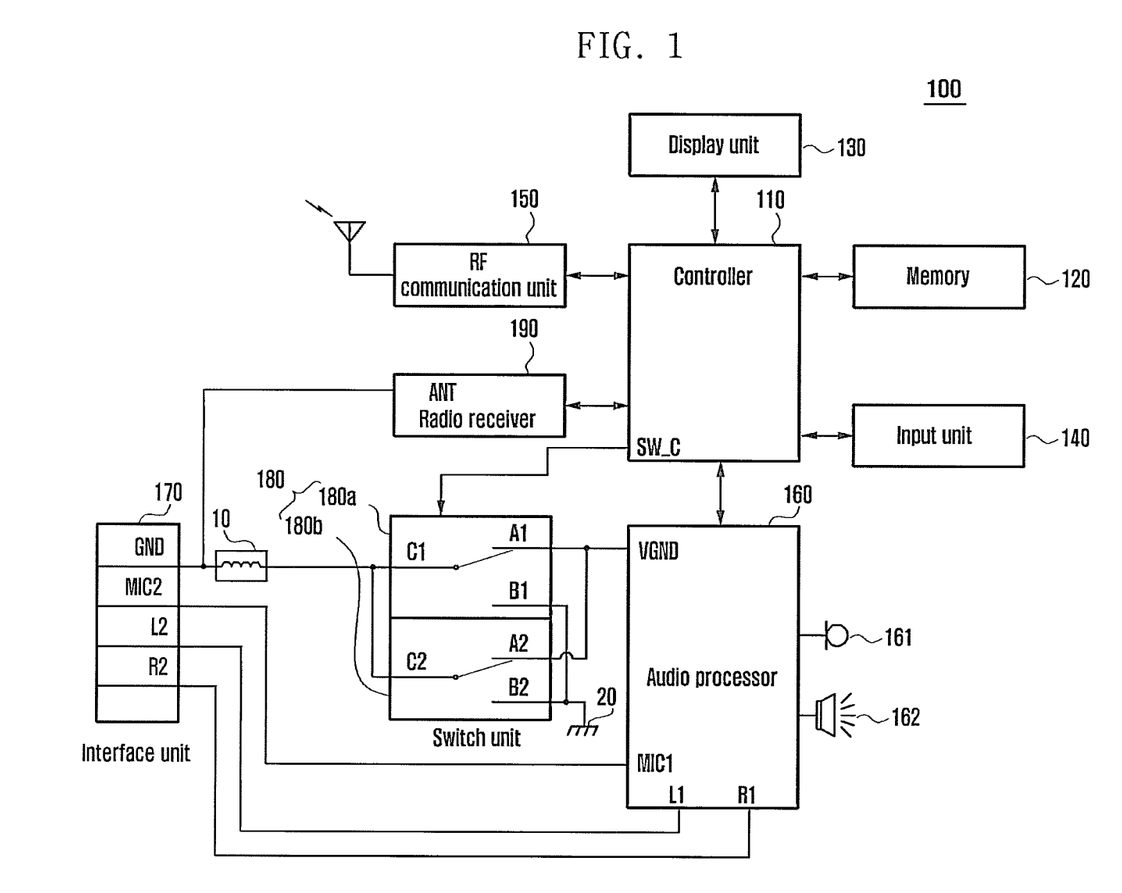
FIG. 1 is a block diagram illustrating a configuration of a terminal according to an exemplary embodiment of the present disclosure.

FIG. 1 is a block diagram illustrating a configuration of a terminal 100 according to an exemplary embodiment of the present disclosure. Referring to FIG. 1, a terminal 100 according to an embodiment of the present disclosure can include a controller 110, a memory 120, a display unit 130, an input unit 140, a radio frequency (RF) communication unit 150, an audio processor 160, an interface unit 170, a switch unit 180, and a radio receiver 190.

The input unit 140 transfers an input signal for inputting various numeric and character information, and an input signal inputted associated with setting respective functions and control of the respective functions to the controller 110. That is, the input unit 140 can include input keys for inputting numeric and character information, and function keys for setting or controlling respective functions of the terminal 100. The function keys can include arrow keys, side keys, and hot keys set such that a specific function is performed. For example, the input unit 140 can include a call key for requesting a call and a function key for executing a radio function. The input unit 140 can be configured by one of a key pad of a general key arrangement and a key pad of a QWERTY type or a combination thereof.

The display unit 130 displays information input by a user or information provided to the user as well as various menus of the terminal 100. For instance, the display unit 130 can provide various screens according to use of the terminal 100, for example, an idle screen, a menu screen, a message creation screen, and a call screen. The display unit 130 can be configured by a Liquid Crystal Display (LCD), an Organic Light Emitted Diode (OLED), or an Active Matrix Organic Light Emitted Diode (AMOLED). When the display unit 130 is provided in the form of a touch screen, the display unit 130 can also act as the input unit 140.

The RF communication unit 150 can form a communication channel for a call and a communication channel for data transmission. That is, the RF communication unit 150 can form a voice call channel, a data communication channel, and a moving call channel. The RF communication unit 150 can transmit a voice signal and an image signal to a terminal of the other party through the voice call channel and the image call channel under control of the controller 110 or receive a voice signal and an image signal from the terminal of the other party. The RF communication unit 150 can include an RF transmission module up-converting a frequency of a transmitted signal and amplifying the converted signal, an RF reception module low-noise-amplifying a received signal and down-converting a frequency of the amplified signal, and a transceiving separation module separating the received signal from the transmitted signal.

Particularly, the RF communication unit 150 can transceive a wireless signal in a TDMA scheme. Due to this, TDMA noise occurs in the terminal 100 according to the present disclosure. Such TDMA noise deteriorates call quality. In particular, during an earphone call, a ground of an earphone is insufficient to increase the influence of the TDMA noise on the call quality. The TDMA noise and the occurrence cause thereof are apparent to those skilled in the art to which the disclosure pertains, and thus a detailed description thereof is omitted.

The radio receiver 190 can receive a radio signal, decode the received radio signal, and transmit the decoded signal to the controller 110. In particularly, the radio receiver 190 does not include a separate antenna but can use an earphone connected to the interface unit 170 as an antenna for receiving a radio signal. That is, the radio receiver 190 can receive a radio signal through an earphone connected through the interface unit 170. To do this, an antenna terminal ANT of the radio receiver 190 is connected to a ground terminal GND of the interface unit 170. The antenna terminal ANT of the radio receiver 170 can be further connected to a matching unit 10. When the matching unit 10 is unnecessary, the antenna terminal ANT of the radio receiver 170 can be connected to input terminals C1 and C2 of the switch unit 180. A detailed description of the radio receiver 170 will be described with reference to the interface unit 170 and the switch unit 180 below.

The matching unit 10 providing filtering and impedance matching functions of a radio signal received through an earphone connected to the interface unit 170. As shown in FIG. 1, the matching unit 10 can be configured by an inductor. However, the present invention is not limited thereto. For example, the matching unit can be configured by a combination of resistors, inductors, and capacitors. Although shown that the matching unit 10 is provided between the interface unit 170 and the switch unit 180, the matching unit 10 can be provided between a second output terminal b of the switch unit 180 and a real ground 20.

The interface unit 170 is a constituent element for connecting an output accessory such as a TV-OUT cable, a 4-pole earphone, a 3-poly earphone, or a TTY cable to the terminal 100. The following description will be made on the assumption that the interface unit 170 is configured by a 3.5 pi connector by way of example. However, the interface unit 170 according to the present invention is not limited to the 3.5π connector. That is, the interface unit 170 can be configured by a 10-pole connector, a 20-pole connector, or a 24-pole connector.

The interface unit 170 can include a ground terminal (GND) for ground, a microphone terminal MIC2 for transmitting a microphone signal, a left sound terminal L2 for transmitting a left sound signal, and a right sound terminal R2 for transmitting a right sound signal. The ground terminal GND of the interface unit 170 can be connected to the antenna terminal ANT of the radio receiver 190 and the matching unit 10. Meanwhile, when the matching unit 10 is unnecessary, the matching unit 10 is provided between second output terminals B1 and B2 and the real ground 20, the ground terminal GND of the interface unit 170 can be connected to the antenna terminal ANT of the radio receiver 190 and input terminals C1 and C2 of the switch unit 180. The microphone terminal MIC2 of the interface unit 170 can be connected to the microphone terminal MIC1 of the audio processor 160, the left sound terminal L2 of the interface unit 170 can be connected to a left sound terminal L1 of the audio processor 160, and a right sound terminal R2 of the interface unit 170 can be connected to a right sound terminal R1 of the audio processor 160. Such a connection relationship will be described when the earphone is mounted in the interface unit 170 by way of example. When another output accessory (e.g., TV-OUT cable) is mounted in the interface unit 170, the foregoing connection relationship of the interface unit 170 can be changed. To do this, the terminal 100 can further include at least one switching circuit changing connection paths of respective terminals of the interface unit 170 according to a type of an output accessory mounted in the interface unit 170 between the interface unit 170 and the audio processor 160.

The switch unit 180 can be provided between the interface unit 170 and the audio processor 160, and can be switched under control of the controller 110. In detail, the switch unit 180 can be switched such that the ground terminal GND of the interface unit 170 is connected to a virtual ground terminal VGND of the audio processor 160 or a real ground 20 of the terminal 100 under control of the controller 110. Here, the virtual ground refers to a ground in which it looks like the ground is short-circuited because a voltage difference between two terminals is approximate to '0' but is not really and physically short-circuited. The real ground refers to a real ground which is physically short-circuited. The virtual ground is apparent to those skilled in the art to which the disclosure pertains, and thus a detailed description thereof is omitted.

It is preferable that the switch unit 180 is configured by a switch having low switch resistance. The switch unit 180 can be configured by two or more switches connected to each other in parallel.

Hereinafter, for convenience for a description, it is assumed that two switches are connected to each other in parallel.

For example, the switch unit 180 can be configured by two switches connected to each other in parallel. The first switch 180*a* can include one input terminal C1 and two output terminals A1 and B1. In the same manner as in the first switch 180*a*, the second switch 180*b* can include one input terminal C2 and two output terminals A2 and B2.

The input terminals C1 and C2 of the switch unit 180 can be connected to the matching unit 10. Meanwhile, when the matching unit 10 is unnecessary, or the matching unit 10 is provided between a second output terminal B1 and the fourth output terminal B4 of the switch unit 180 and the real ground 20, the input terminals C1 and C2 can be connected to the ground terminal GND of the interface unit 170 and the antenna terminal ANT of the radio receiver 190. The first output terminal A1 and the third output terminal A2 of the switch unit 180 are connected to a virtual ground terminal VGND of the audio processor 160. The second output terminal B1 and the fourth output terminal B2 of the switch unit 180 are connected to the real ground 20 of the terminal 100. Respective switches 180*a* and 180*b* change switch connection according to a switch control signal outputted from a control terminal SW_C of the controller 110. The first switch 180*a* can connect the input terminal C1 to a first output terminal A1 or connect the input terminal C1 to the second output terminal B1 according to a switch control signal outputted from the control terminal SW_C. In the same manner as in the first switch 180*a*, the second switch 180*b* can connect the input terminal C2 to the third output terminal A1 or connect the input terminal C2 to the fourth output terminal B2 according to the switch control signal outputted from the control terminal SW_C.

Figure 2:
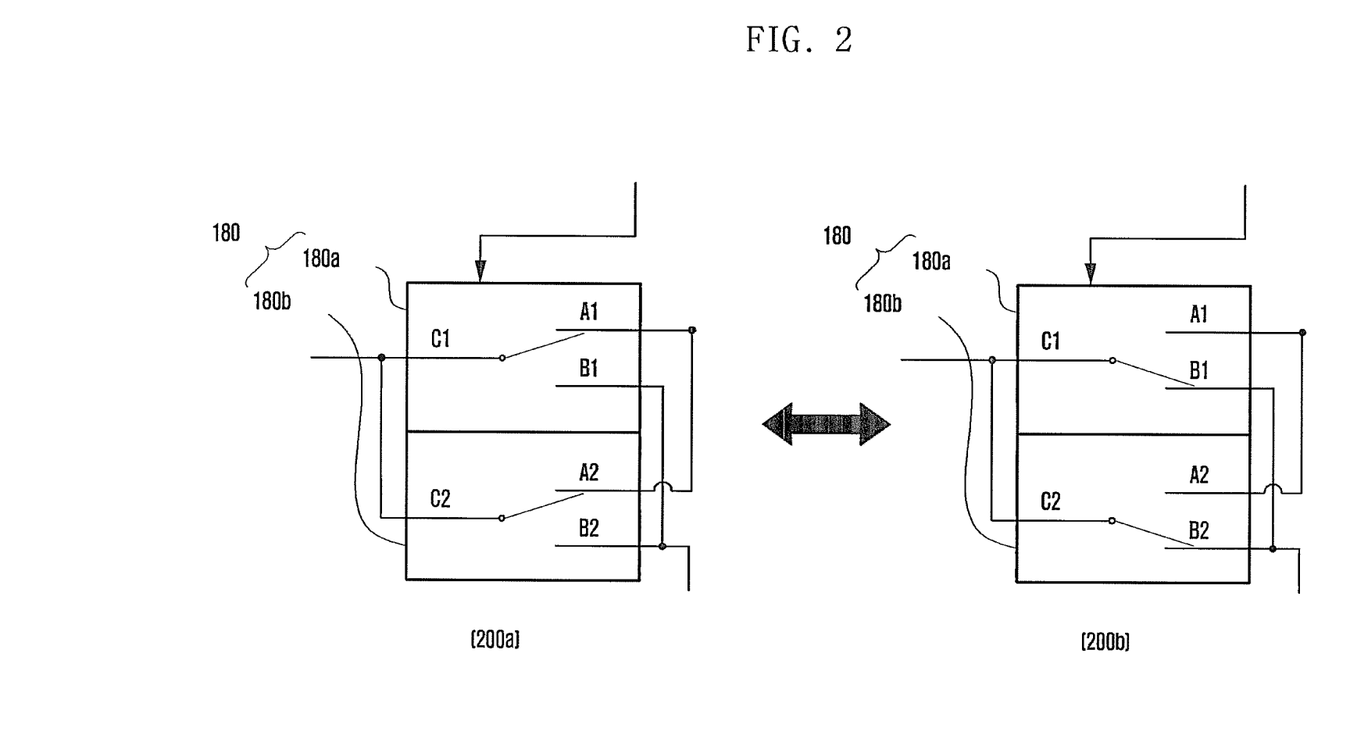
FIG. 2 is a diagram illustrating an operation of a switch unit according to an exemplary embodiment of the present disclosure.

FIG. 2 is a diagram illustrating an operation of a switch unit 180 according to an exemplary embodiment of the present disclosure. Referring to FIG. 1, as described, above, the first and third output terminals A1 and A2 are connected to the virtual ground VGND, and the second and forth output terminals B1 and B2 are connected to the real ground 20. When the controller 110 is necessary to be connected to the virtual ground VGND, for example, when a telephone call starts through a wireless communication network, it connects a ground terminal GND of the interface unit to the virtual ground terminal VGND. To do this, the controller 110 transmits a switch control signal such that the first input terminal C1 is connected to the first output terminal A1 and the second input terminal C2 is connected to the third output terminal A1 through the control terminal SW_C.

To control at least two switches, at least two switch control signals must be fundamentally inputted. However, respective switches 180*a* and 180*b* constituting the switch 180 can substantially perform the same operation at the same time. Accordingly, it is preferable that two switches 180*a* and 180*b* constituting the switch unit 180 are configured to perform the same operation with respect to the same switch control signal. For example, the two switches 180*a* and 180*b* can be configured by the same type of switch. When receiving a first control signal, two switches 180*a* and 180*b* can connect input terminals C1 and C2 to output terminals A1 and A2 which are connected to the virtual ground VGND, respectively (202*a*). Meanwhile, when receiving a second control signal, the two switches 180*a* and 180*b* can connect the input terminals C1 and C2 to output terminals B1 and B2 which are connected to the real ground 20, respectively. The exemplary table 1 illustrates operations of the switches 180*a* and 180*b*.

TABLE 1

| Switch control signal | Connect with C1 | Connect with C2 |
|---|---|---|
| First control signal (1) | A1 | A2 |
| Second control signal (0) | B1 | B2 |

In the same manner as a case of only two switches, three or more switches can equally operate. Although two or more switches are different types, if controlling an according operation as illustrated in the table 1 according to the same switch control signal, the switches can also configure the switch unit 180. When the switch unit 180 is inevitably configured by switches which cannot perform the same operation according to the same switch control signal, a converter suitably converting a switch control signal outputted from a control terminal SW_C and transferring the converted switch control signal to switches constituting the switch unit 180 must be provided. According to another embodiment, the controller 110 can generate and transmit a control signal for separately controlling the switches 180*a* and 180*b*.

For instance, the first control signal and the second control signal can become 1 and 0 as illustrated in the table 1, respectively. According to another embodiment, the first control signal and the second control signal can become 0 and 1, respectively. According to yet another embodiment, control signals of the switches 180*a* and 180*b* can have values other than 0 and 1, or be configured by a part of other complex signals.

Referring back to FIG. 1, the audio processor 160 can be configured by a sound component for transceiving an audio to perform encoding and decoding. Such an audio processor 160 can include a CODEC and an audio amplifier AMP. Particularly, the audio processor 160 according to the embodiment of the present disclosure can include a virtual ground. The audio processor 160 is connected to a microphone 161 and a speaker 162. The audio processor 160 converts a voice signal inputted from the microphone 161 into data and transmits the data to the controller 110. The audio processor 160 can convert a voice signal inputted from the controller 110 into an analog signal, and output the analog signal through the speaker 162. The audio processor 160 can output various audio signals (e.g., MP3 files, audio signal according to playback of a moving image file) generated by the terminal 100 through the speaker 162. The audio processor 160 can receive a voice signal through a microphone included in an output accessory (e.g., earphone) or output a voice signal and an audio signal inputted from the controller 110 through a speaker included in an output accessory. To do this, when an earphone is connected to the interface unit 170, a microphone terminal MIC1 of the audio processor 160 can be connected to a microphone terminal MIC2 of the interface unit 170, a left sound terminal L1 of the audio processor 160 outputting a left sound signal can be connected to a left sound terminal L2 of the interface unit 170, a right sound terminal R1 of the audio processor 160 outputting a right sound signal can be connected to a right sound terminal R2 of the interface unit 170, and a virtual ground VGND of the audio processor 160 can be connected to the first output terminal A1 and the third output terminal A2 of the switch unit 180.

The memory 120 can store an operating system (OS) of the terminal 100, an application program necessary for other options functions, for example, a voice playback function, an image or moving image playback function, user data, and transceived data. Particularly, the memory 120 according to the present disclosure can store a program controlling the switch unit 180 such that a ground terminal GND of the interface unit 170 is connected to a virtual ground terminal VGND of the audio processor 160 or the ground terminal GND of the interface unit 170 is connected to the real ground 20 according to activation of an earphone call function.

The controller 110 can control an overall operation of the terminal and signal flow between internal blocks of the terminal 10. Particularly, the controller 110 according to the present disclosure can control the switch unit 180 according to activation of the earphone call function. In detail, when the earphone call function is activated, the controller 110 can control the switch unit 180 to connect the ground terminal GND of the interface unit 170 to the virtual ground terminal VGND of the audio processor 160. Conversely, when a current state is the earphone call state, for example, an earphone non-mounted state, a state that an earphone is mounted but a call is not requested, or a radio reception function activation state, the controller 110 can control the switch unit 180 to connect the ground terminal GND of the interface unit 170 to the virtual ground 20. To do this, the controller 110 can include a means for detecting mounting of an output accessory and a means for determining a type of a mounted output accessory. The controller 110 does not include a separate means for determining the output accessory. When the mounting of the output accessory is detected, the controller 110 can output a supportable output accessory list on the display unit 130 and recognize that an output accessory selected from the list by the user is mounted in the interface unit 170.

The controller 110 can determine whether a call function is activated (a call request is generated) in a state that an earphone is mounted in the interface unit 170. The call request include a sending call and a receiving call. When the call request is generated, the controller 110 can control the switch unit 180 to connect the ground terminal GND of the interface unit 170 to the virtual ground terminal VGND of the audio processor 160. To do this, the controller 110 can generate a control signal to request such that a first input terminal C1 of the first switch 180*a* is connected to the first output terminal A1 of the first switch 180*a*, and the second input terminal C2 of the second switch 180*b* is connected to the third output terminal A2 of the second switch 180*b*. As described above, the terminal 100 according to the embodiment of the present disclosure can reduce TDMA noise induced in an earphone to a magnitude which the user cannot recognize by connecting a ground of the earphone by a virtual ground not a real ground. That is, the embodiment of the present disclosure can efficiently remove TDMA noise.

Meanwhile, when the call is terminated, the controller 110 can control the switch unit 180 to connect the real ground 20 to a ground terminal GND of the interface unit 170. To do this, the controller 110 can generate a control to request such that a first input terminal C1 of the first switch 180*a* is connected to the second output terminal B1 of the first switch 180*a* and the second input terminal C2 of the second switch 180*b* is connected to the fourth output terminal B2 of the second switch 180*b*, and transmit the control signal to the switches 180*a* and 180*b*. This is performed to prevent a side effect occurring when a virtual ground is connected to the ground terminal GND of the interface unit 170 in a state that TDMA noise is not generated. For instance, when a radio function is activated in a state that the virtual ground is connected to the ground terminal GND of the interface unit 170, a radio receiving performance can be deteriorated.

The foregoing embodiment has illustrated that a real ground 20 is connected to the ground terminal GND of the interface unit 170 when the earphone call is terminated. However, the present disclosure is not limited thereto. For example, when the earphone call is terminated, another embodiment of the present disclosure controls to maintain a connected state between the ground terminal GND of the interface unit 170 and the virtual ground. When a radio receiving function is activated, another embodiment of the present disclosure can control such that the real ground 20 is connected to the ground terminal GND of the interface unit 170.

A still another embodiment of the present disclosure can control the switch unit 180 according to activation of the radio receiving function. When the radio receiving function is not activated, the still another embodiment of the present disclosure can control the switch unit 180 to connect a virtual ground to a ground terminal GND of the interface unit 170.

When the radio receiving function is activated, the still another embodiment of the present disclosure can control the switch unit 180 to connect a real ground 20 to a ground terminal GND of the interface unit 170.

Although not shown in FIG. 1, the terminal 100 can further include structural elements having additional functions such as a camera module for photographing images or moving images, a near distance communication module for near distance wireless communication, a broadcast receiving module for receiving broadcast, a digital sound source module like an MP3 module, and an Internet communication module executing Internet functions. Since the structural elements can be variously changed according to convergence trend of a digital device, no elements can be listed. However, the portable terminal 100 can include structural elements equivalent to the foregoing structural elements.

Figure 3:
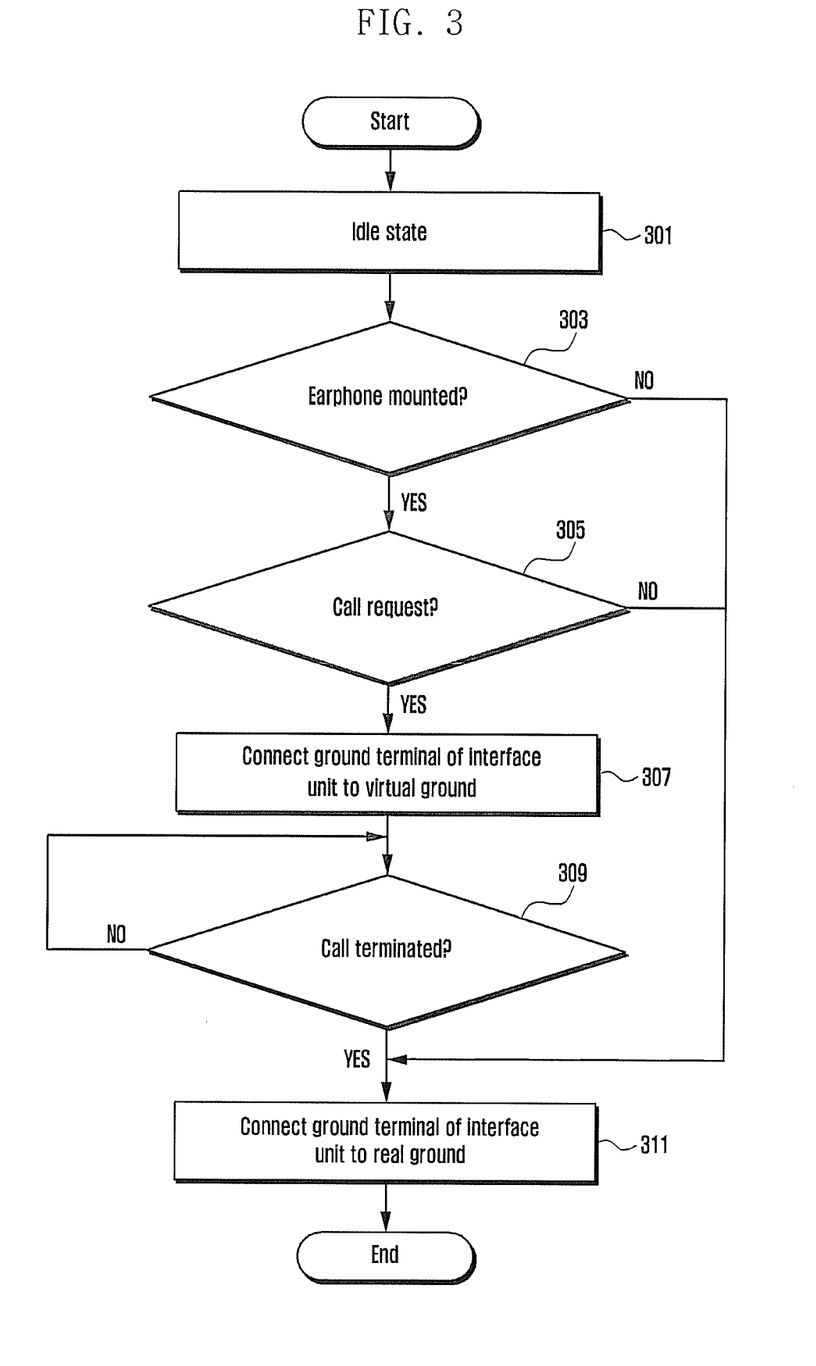
FIG. 3 is a flowchart illustrating a method of reducing TDMA noise in a portable terminal according to an exemplary embodiment of the present disclosure.

FIG. 3 is a flowchart illustrating a method of reducing TDMA noise in a portable terminal according to an exemplary embodiment of the present disclosure. Hereinafter, a method of reducing TDMA noise in a portable terminal according to the present will be described with reference to FIG. 1.

Referring to FIGS. 1 and 3, a controller 110 is in an idle state (301). The controller 110 determines whether an earphone is mounted in the interface unit 170 (303). To do this, the controller 110 can include an output accessory mounting detector and an output accessory discriminator. The controller 110 does not include a separate discriminator for discriminating an output accessory. When the mounting of the output accessory is detected, the controller 110 can output a supportable output accessory list on the display unit 130, and recognize that an output accessory selected by a user is mounted in the interface unit 170.

When the earphone is not mounted in the interface unit 170 at step 303, a process goes to step 311. That is, the terminal 100 can control a switch unit 180 to connect a real ground 20 to the ground terminal GND of the interface unit 170. Conversely, when the earphone is mounted in the interface unit 170 at step 303, the controller 110 can determine whether a call request is generated, namely, a call function is activated (305). The call request can include a sending call and a receiving call. When the call request is not generated at step 305, the process can go to step 311 to be describe below. Conversely, when the call request is generated at step 305, the controller 110 can control the switch unit 180 to connect a ground terminal GND of the interface unit 170 to a virtual ground (307). The virtual ground can be included in a sound component outputting an audio signal, for example, an audio processor 160. This is performed to transmit an audio signal to be transmitted to the earphone with reference to a ground level of a sound component.

Step 307 is described in detail. If a call request is generated in a state that an earphone is mounted in the interface unit 170, the controller 110 can generate a control signal for controlling such that a ground terminal GND of the interface unit 170 is connected to a virtual ground terminal VGND of the audio processor 160, and transmit the control signal to the switch unit 180 through a control terminal SW_C. The switches 180*a* and 180*b* of the switch unit 180 having received the control signal can connect the ground terminal GND of the interface unit 170 to the virtual ground terminal VGND of the audio processor 160 by connecting input terminals C1 and C2 to the first output terminal A1 and the third output terminal A2, respectively.

After that, the controller 110 can determine whether a call is terminated (309). When the call is not terminated, the controller 110 can maintain a state of step 307. Conversely, when the call is terminated, the controller 110 can connect the ground terminal GND of the interface unit 170 to the real ground 20 (311). In detail, when the call is terminated, the controller 110 can generate a control signal for controlling such that a ground terminal GND of the interface unit 170 to the real ground 20, and transmit the control signal to the switch unit 180 through a control terminal SW_C.

The switches 180*a* and 180*b* of the switch unit 180 having received the control signal can connect the ground terminal GND of the interface unit 170 to the real ground 20 by connecting input terminals C1 and C2 to the second output terminal B1 and the fourth output terminal B2, respectively. Meanwhile, even if the foregoing embodiment has illustrated that the ground terminal GND of the interface unit 170 is connected to the real ground 20 when the earphone call is terminated, the present disclosure is not limited thereto. For example, when the earphone call is terminated, another embodiment of the present disclosure controls such that a connected state between the ground terminal GND of the interface unit 170 and the virtual ground maintains. When a radio receiving function is activated, another embodiment of the present disclosure can control such that the ground terminal GND of the interface unit 170 is connected to the real ground 20.

Another embodiment of the present disclosure can control the switch unit 180 according to activation of the radio receiving function. When the radio receiving function is not activated, still another embodiment of the present disclosure can control the switch unit 180 to connect the ground terminal GND of the interface unit 170 to the virtual ground. When the radio receiving function is activated, still another embodiment of the present disclosure can control the switch unit 180 to connect the ground terminal GND of the interface unit 170 to the real ground 20.

As described above, the method of reducing TDMA noise in a portable terminal according to an embodiment of the present disclosure can be implemented in the form of a program command capable of being performed through various computer means and be recorded in a computer readable recording medium. In this case, the computer readable recording medium can include a program command, a data file, and a data structure individually or a combination thereof. In the meantime, the program command recorded in a recording medium can be specially designed or configured for the present disclosure or be known to a person having ordinary skill in a computer software field to be used.

The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. Further, the program command includes a machine language code created by a complier and a high-level language code executable by a computer using an interpreter. The foregoing hardware device can be configured to be operated as at least one software module to perform an operation of the present disclosure.

Figure 4A:
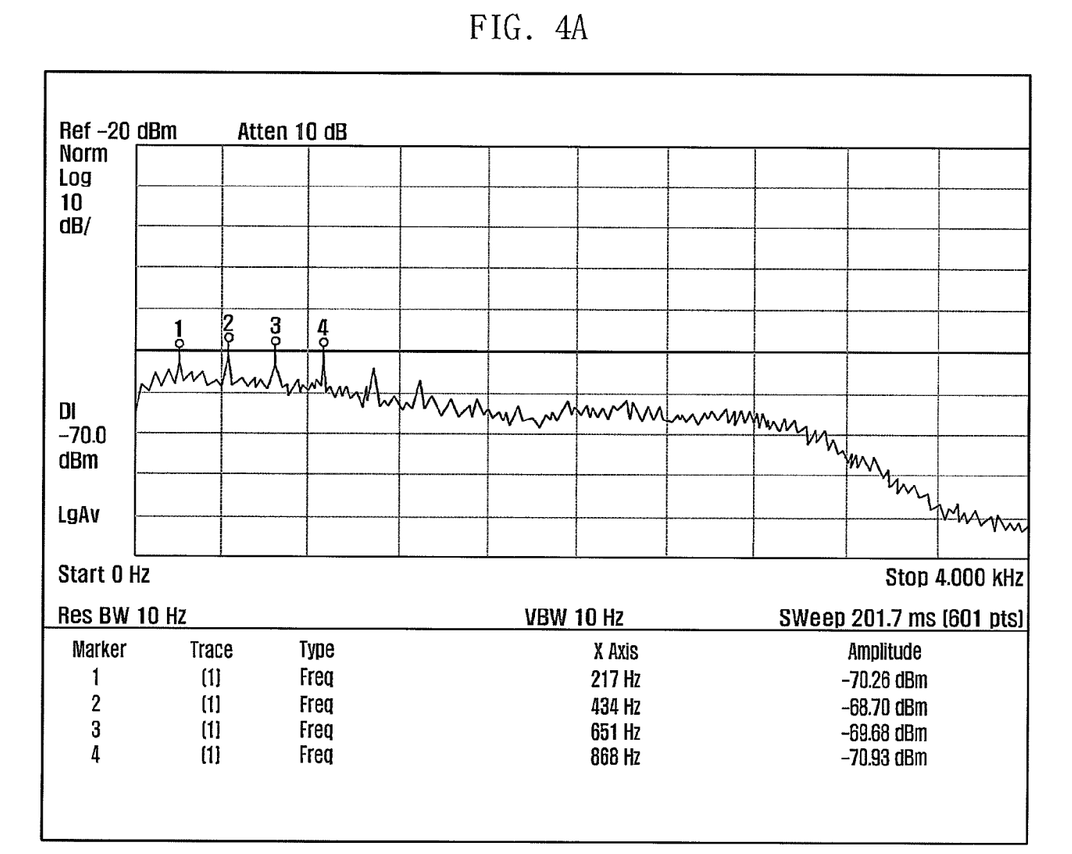
FIGS. 4a and 4b are graphs illustrating a noise reducing effect of a portable terminal according to an exemplary embodiment of the present disclosure.
Figure 4B:
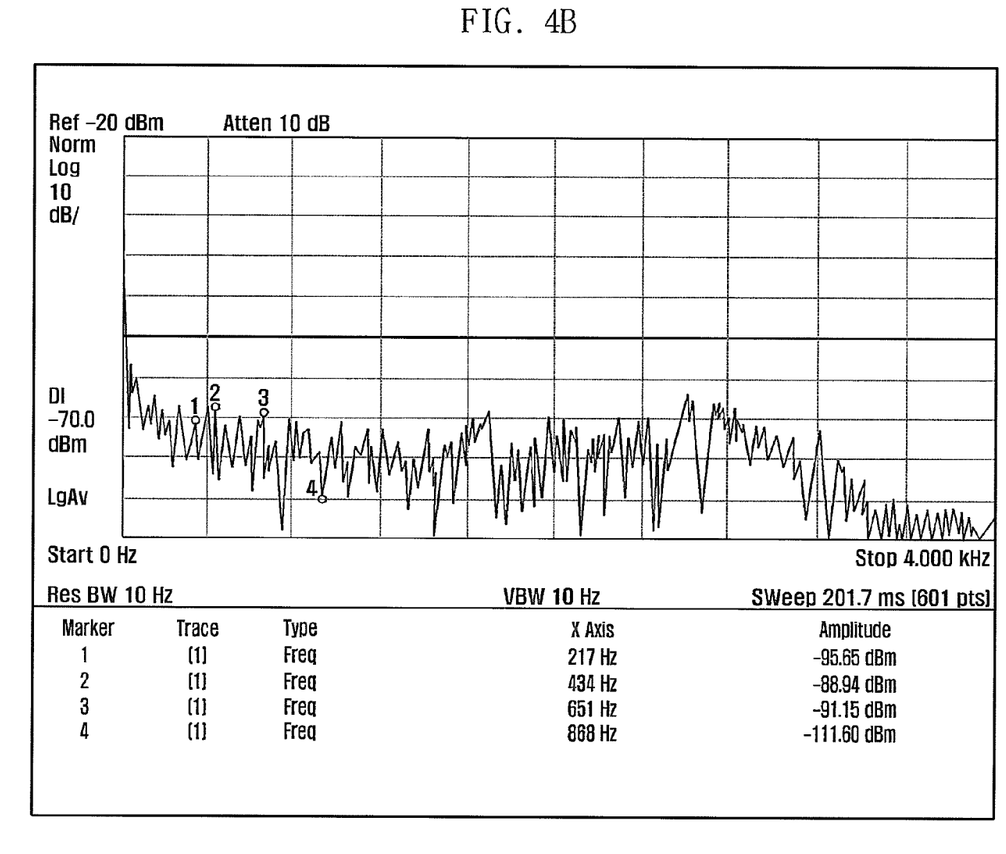

FIGS. 4*a* and 4*b* are graphs illustrating a noise reducing effect of a portable terminal according to an exemplary embodiment of the present disclosure.

A first graph of FIG. 4*a* is a graph of measuring a TDMA noise level during an earphone call of the portable terminal according to the related art. A second graph of FIG. 4*b* is a graph of measuring a TDMA noise level during an earphone call of the portable terminal 100 according to an embodiment of the present disclosure.

Referring to FIG. 4a, TDMA noise of the portable terminal according to the related art has a magnitude in a range of about −60 dBm to about −70 dBm. In general, when the audio signal has a magnitude greater than −70 dBm, the user can recognize it. Accordingly, when the user performs an earphone call by the portable terminal according to the related art, the user can recognize the TDMA noise. Due to this, the user can be dissatisfied with call quality. Conversely, referring to FIG. 4b, the TDMA noise of the portable terminal according to an embodiment of the present disclosure has the magnitude in the range of about −80 dBm about −110 dBm. That is, when performing an earphone call by the portable terminal 100 according to an embodiment of the present disclosure, the user does not recognize the TDMA noise. Through this, the present disclosure can provide TDMA noise reducing effect, and provide satisfaction with respect to call quality to the user.

The switches 180a and 180b constituting the switch unit 180 have direct current resistance Rdc. If resistance of the switch unit 180 is increased, earphone channel separation is reduced. The earphone channel separation is an index indicating how exactly left and right sounds of the earphone are divided to independently play a voice.

The exemplary table 2 indicates an earphone channel separation according to resistance of the switch unit 180 according to the embodiment of the present disclosure.

TABLE 2

| Resistance (Rdc) | 1.00 Ω | 0.5 Ω | 0.25 Ω |
|---|---|---|---|
| earphone channel separation | 29 dB | 35 dB | 41 dB |

A generally used switch component has resistance of about 0.5Ω. Assuming that the switches 180a and 180b of the switch unit 180 have resistance of 0.5Ω, when two switches are connected to each other in parallel as illustrated in FIG. 1, total resistance of the switch unit 180 is 0.25Ω by a parallel connection calculation method of resistors. Accordingly, when connecting two switches to each other in parallel, resistance of 0.25Ω can be reduced and earphone channel separation can be improved to 6 dB.

According to the embodiment of the present disclosure, each of the switches 180a and 180b can have resistance in the range of 0.4Ω to 0.6Ω. In this case, the switch unit 180 can represent resistance in the range of 0.2Ω to 0.3Ω by connecting the two switches 180a and 180b to each other in parallel. According to another embodiment of the present disclosure, each of the switches 180a and 180b can represent resistance in the range of 0.25Ω to 0.5Ω. In this case, the switch unit 180 can represent resistance in the range of 0.2Ω to 0.3Ω by connecting the two switches 180a and 180b to each other in parallel.

An embodiment of the present disclosure can efficiently TDMA noise to improve call quality of an earphone call. According to the embodiment of the present disclosure, when the portable terminal has a radio function, receiving performance deterioration of a radio receiver occurring due to connection of a ground of an earphone with a virtual ground can be prevented, and TDMA noise induced in an earphone during an earphone call may be efficiently reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for reducing Time Division Multiple Access (TDMA) noise in a terminal transceiving a wireless signal in a TDMA scheme, the apparatus comprising:
   an interface unit adapted to couple to an output accessory;
   an audio processor including a virtual ground, the audio processor configured to transceive an audio signal to and from the output accessory through the interface unit;
   a switch unit coupled between the interface unit and the audio processor, the switch unit configured to vary the connection of a ground terminal of the interface unit to one of a real ground or the virtual ground of the audio processor, wherein the switch unit comprises a first switch and a second switch that are connected to each other in parallel; and
   a controller configured to:
      determine whether the output accessory is mounted in the interface unit,
      transmit a first switch control signal to the first switch and the second switch when the call function using the output accessory is activated,
      when the output accessory is mounted in the interface unit, control the first switch and second switch to connect the ground terminal of the interface unit to the virtual ground when a call function is activated, and control the first switch and second switch to connect the ground terminal of the interface unit to the real ground when the call function is inactivated,
      wherein, upon receiving first swatch control signal, the first switch is configured to connect one terminal of the first switch, the one terminal being connected to the ground terminal of the interface unit, to another terminal of the first switch, the another terminal being connected to the virtual ground of the audio processor when the call function using accessory is activated,
      when the output accessory is not mounted in the interface unit, control the first switch and second switch to connect the ground terminal of the interface unit to the real ground.

2. The apparatus of claim 1, wherein one terminal of the first switch is connected to the ground terminal of the interface unit and another terminal of the first switch is connected to the virtual ground of the audio processor, and the controller is configured to control the first switch to connect the one terminal to the another terminal.

3. The apparatus of claim 1, wherein one terminal of the second switch is connected to the ground terminal of the interface unit and another terminal of the second switch is connected to the virtual ground of the audio processor, and the controller is configured to control the second switch to connect the one terminal to the another terminal.

4. The apparatus of claim 1, wherein
   upon receiving the first switch control signal, the second switch is configured to connect one terminal of the second switch, the one terminal being connected to the ground terminal of the interface unit, to another terminal of the second switch, the another terminal being connected to the virtual ground of the audio processor, when the call function using the output accessory is activated.

5. The apparatus of claim 1, further comprising a radio receiver receiving a radio signal,
   wherein the ground terminal of the interface unit is further connected to an antenna terminal of the radio receiver.

6. The apparatus of claim 5, wherein when a radio function is activated using the radio receiver, the controller is configured to control the switch unit to connected the ground terminal of the interface unit to the real ground.

7. The apparatus of claim 6, further comprising a matching unit coupled between the interface unit and the radio receiver, the matching unit configured to perform impedance matching of the radio signal.

8. The apparatus of claim 1, wherein the interface unit includes a 3.5 π connector.

9. A method of reducing Time Division Multiple Access (TDMA) noise in a terminal including a radio frequency communication unit transceiving a wireless signal in a TDMA scheme, an interface unit adapted to couple to an output accessory, an audio processor including a virtual ground, and a switch unit coupled between the interface unit and the audio processor and configured to vary the connection of a ground terminal of the interface unit to one of a real ground or the virtual ground of the audio processor, wherein the switch unit comprises a first switch and a second switch that are connected to each other in parallel, the method comprising:
  determining whether the output accessory is mounted in the interface unit;
  transmit a first switch control signal to the first switch and the second switch when the call function using the output accessory is activated;
  when the output accessory is mounted in the interface unit, controlling the first switch and second switch to connect the ground terminal of the interface unit to the virtual ground of the audio processor when a call function is activated, and to connect the ground terminal of the interface unit to the real ground when the call function is inactivated,
  wherein, upon receiving the first switch control signal, the first switch is configured to connect one terminal of the first switch, the one terminal being connected to the ground terminal of the interface unit, to another terminal of the first switch, the another terminal being connected to the virtual ground of the audio processor, when the call function using the output accessory is activated
  wherein the audio processor is configured to transceive an audio signal to and from the output accessory through the interface unit.

10. The method of claim 9, wherein one terminal of the first switch is connected to the ground terminal of the interface unit and another terminal of the first switch is connected to the virtual ground of the audio processor, and wherein the controller is configured to control the first switch to connect the one terminal to the another terminal.

11. The method of claim 9, wherein one terminal of the second switch is connected to the ground terminal of the interface unit and another terminal of the second switch is connected to the virtual ground of the audio processor, and wherein the controller is configured to control the second switch to connect the one terminal to the another terminal.

12. The method of claim 9, wherein the second switch is configured to connect one terminal of the second switch, the one terminal being connected to the ground terminal of the interface unit, to another terminal of the second switch, the another terminal being connected to the virtual ground of the audio processor, when the call function using the output accessory is activated.

13. The method of claim 9, further comprising:
  a radio receiver receiving a radio signal, wherein the ground terminal of the interface unit is further connected to an antenna terminal of the radio receiver.

14. The method of claim 13, further comprising:
  controlling the switch unit to connect the ground terminal of the interface unit to the real ground when a radio function is activated using the radio receiver.

\* \* \* \* \*